(12) United States Patent
Grylls et al.

(10) Patent No.: US 6,521,053 B1
(45) Date of Patent: Feb. 18, 2003

(54) IN-SITU FORMATION OF A PROTECTIVE COATING ON A SUBSTRATE

(75) Inventors: Richard John Grylls, Loveland, OH (US); Curtiss Mitchell Austin, Loveland, OH (US)

(73) Assignee: General Electric Co., Cincinnati, OH (US)

(*) Notice: Subject to any disclaimer, the term of this patent is extended or adjusted under 35 U.S.C. 154(b) by 27 days.

(21) Appl. No.: 09/708,825

(22) Filed: Nov. 8, 2000

(51) Int. Cl.[7] ................................ C23C 8/04
(52) U.S. Cl. .................. 148/280; 148/242; 148/279; 427/244; 427/373; 427/405
(58) Field of Search ................ 148/272, 279, 148/280; 427/244, 373, 405

(56) References Cited

U.S. PATENT DOCUMENTS

| 4,375,233 A | 3/1983 | Rossmann et al. | |
|---|---|---|---|
| 4,673,435 A | 6/1987 | Yamaguchi et al. | .......... 75/235 |
| 4,955,135 A | 9/1990 | Pinkhasov | |
| 4,956,137 A | 9/1990 | Dwivedi | |
| 5,011,063 A | 4/1991 | Claar | |
| 5,061,660 A * | 10/1991 | Park et al. | .................. 252/516 |
| 5,214,011 A | 5/1993 | Breslin | .................... 501/127 |
| 5,236,151 A * | 8/1993 | Hagle et al. | ............. 244/117 A |
| 5,308,422 A | 5/1994 | Askay et al. | |
| 5,503,213 A | 4/1996 | Pyzik et al. | |
| 5,518,061 A | 5/1996 | Newkirk et al. | ............... 164/97 |
| 5,728,638 A | 3/1998 | Strange et al. | ............... 501/127 |

OTHER PUBLICATIONS

J. Ringnald et al., "Scanning and Transmission Electron Microscopy on Composite Materials prepared by SMP and In–Situ Displacive Reactions," *Inst.Phys.Conf.Ser.* No. 147, Section 13, pp. 571 et seq. (1995). (No month data).

Nine page printout from Internet page of BFD, Inc, www.bfd–inc.com, printed Apr. 24, 2000.

Guide to Selection of Superalloys, *Metal Progress*, Mid Jun. 1978, pp. 107–107.

* cited by examiner

*Primary Examiner*—John Sheehan
*Assistant Examiner*—Andrew L. Oltmans

(57) ABSTRACT

A substrate is protected by first providing the substrate, and applying a ceramic coating overlying and bonded to the substrate. The ceramic coating is formed of an open-cell solid foam of ceramic cell walls having an interconnected intracellular volume therebetween which is filled at least in part with a metallic alloy. The ceramic coating has an exposed surface remote from the substrate. The exposed surface of the ceramic coating is heated to an exposure temperature such that at least some of the metallic alloy is lost from the intracellular volume.

19 Claims, 4 Drawing Sheets

IN-SITU FORMATION OF A PROTECTIVE COATING ON A SUBSTRATE

This invention relates to a ceramic thermal barrier coating on a substrate, and, more particularly, to the in-situ formation of a thermal protective coating on the substrate.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the hot-section components of the engine. These components include the turbine vanes and turbine blades of the gas turbine, upon which the hot combustion gases directly impinge. In current engines, the turbine vanes and blades are made of nickel-based superalloys, and can operate at temperatures of up to about 1800–2100° F. These components are also subject to damage by oxidation and corrosive agents, as well as impact damage and erosion by particles entrained in the combustion gas stream.

Many approaches have been used to increase the operating temperature limits and service lives of the turbine blades and vanes to their current levels, while achieving acceptable oxidation, corrosion, erosion, and impact resistance. The composition and processing of the base materials themselves have been improved. Cooling techniques are used, as for example by providing the component with internal cooling passages through which cooling air is flowed.

In another approach used to protect the hot-section components, a portion of the surfaces of the airfoil sections of the turbine blades and/or vanes is coated with a thermal barrier coating system. The thermal barrier coating systems typically include a bond coat that contacts the substrate, and a ceramic thermal barrier coating (TBC) layer overlying the bond coat. The bond coat protects the articles against the oxidative and corrosive effects of the combustion gas. The ceramic layer provides thermal insulation and some environmental protection. The turbine blades and turbine vanes are thereby able to run cooler and are more resistant to environmental attack in the presence of the thermal barrier coating systems.

Although the thermal barrier coating approach is operable and widely used, there is opportunity for improvement. In the existing approach, if the thermal barrier coating is significantly damaged during service such as by an impact that chips away a region of the ceramic layer, the thermal insulation is lost. The loss of the thermal insulation properties may lead to catastrophic damage to the substrate. There is a need to make the protection of the substrate less susceptible to such damage of the thermal barrier coating. The present invention fulfills this need, and further provides related advantages.

BRIEF SUMMARY OF THE INVENTION

The present invention provides a method for protecting a substrate using a ceramic coating which is comparable in some ways to a thermal barrier coating. The present ceramic coating differs from the conventional thermal barrier coating in several ways. Its physical structure provides for a ceramic-based coating, but utilizes a trapped gas space to reduce thermal conductivity. It is more resistant to damage such as impact damage than a conventional thermal barrier coating. The present ceramic coating forms a ceramic thermal barrier in an in-situ fashion. As a result, the ceramic coating is selfforming during an initial break-in period and/or during service. It forms selectively where needed. It is also self-healing during service in the event that it is damaged. A method for protecting a substrate comprises the steps of providing a substrate and applying a ceramic coating overlying and bonded to the substrate. The ceramic coating comprises an open-cell solid foam of ceramic cell walls having an interconnected intracellular volume therebetween which is filled at least in part with a metallic alloy. The ceramic coating has an exposed surface remote from the substrate. The method further includes heating the exposed surface of the ceramic coating to an exposure temperature such that at least some of the metallic alloy is lost from the intracellular volume. The heating to the exposure temperature may occur during manufacturing or an initial break-in period, or it may occur during service.

The exposure temperature is typically at or slightly above the solidus temperature of the metallic alloy. The metallic alloy at least partially melts, and is lost from the exposed surface of the ceramic coating by being blown out by the gas flow or flung outwardly by centrifugal force. Any other operable way of removing the metallic alloy at the exposed surface may also be used. When the metallic alloy is lost, there remains the ceramic cell walls with empty porosity therebetween. The empty porosity has two beneficial effects. It reduces the thermal conductivity of the ceramic coating by providing an insulating gas barrier within the intracellular volume. The empty porosity also reduces the weight of the coated substrate, thereby reducing loading on the supporting structure.

The desirable structure forms only as needed, in the regions that are exposed to the most severe heating and other environmental conditions. In other regions that are less severely exposed and/or underlie the ceramic cell walls with intracellular porosity, the intracellular metallic alloy remains. The intracellular metal imparts improved resistance to brittle fracture and thence reduced susceptibility to impact damage in those other regions.

This mode of formation of the insulating structure also renders the ceramic coating self-healing and self-repairing. If a piece of the ceramic coating is worn or chipped away or otherwise removed during service, fresh ceramic cell walls and intracellular metallic alloy are exposed to the environment. The metallic alloy is removed by the same mechanisms as discussed earlier, leaving new solid-foam ceramic material with intracellular porosity to protect the underlying substrate.

The ceramic coating is preferably formed by depositing a precursor material onto the surface of the substrate, either with or without a bond coat. The precursor material comprises a sacrificial ceramic, and a reactive metal which is reactive with the sacrificial ceramic to form an open-celled ceramic foam. The sacrificial ceramic and the reactive metal are reacted to form a ceramic coating having an exposed surface and ceramic cell walls of an oxidized ceramic of the reactive metal, and an interconnected intracellular volume therebetween filled at least in part with a metallic alloy. The metallic alloy may be replaced with another metallic alloy if desired. In a typical case, the sacrificial ceramic is silicon dioxide (silica) and the reactive metal is aluminum. The resulting ceramic cell walls are aluminum oxide (alumina) and desirably constitute from about 60 to about 80 percent by volume of the ceramic coating. The initial intracellular metallic alloy is an aluminum alloy, and it may be replaced at least in part with a nickel alloy such as a nickel-base superalloy.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
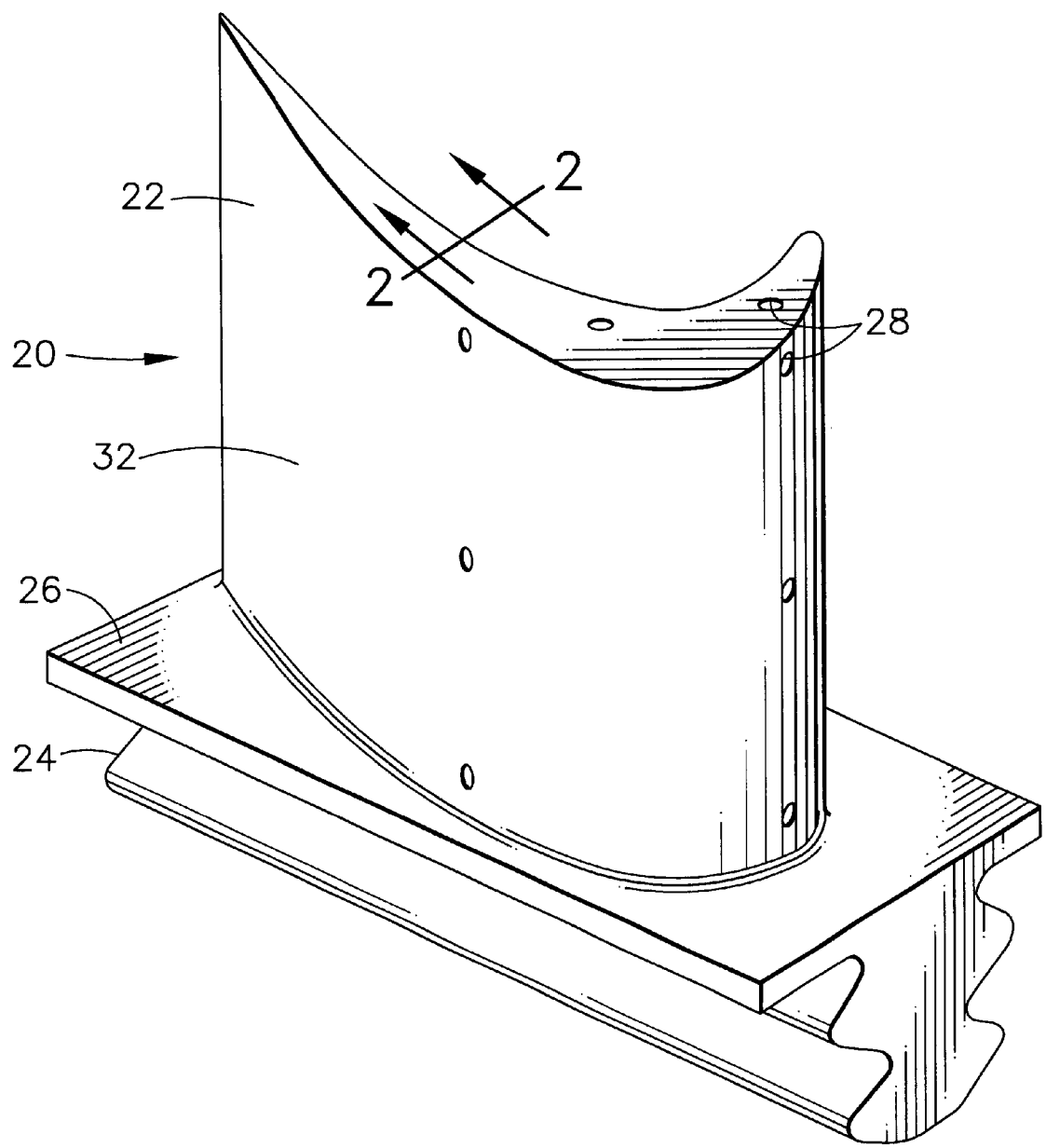
FIG. 1 is a perspective view of a turbine blade.

FIG. 1 depicts a gas turbine engine component such as a turbine blade or turbine vane, and in this illustration a turbine blade 20. The turbine blade 20 is preferably formed of a nickel-base superalloy. The turbine blade 20 includes an airfoil 22 against which the flow of hot exhaust gas is directed. (The turbine vane has a similar appearance in respect to the pertinent portions.) The turbine blade 20 is mounted to a turbine disk (not shown) by a dovetail 24 which extends downwardly from the airfoil 22 and engages a slot on the turbine disk. A platform 26 extends laterally outwardly from the area where the airfoil 22 is joined to the dovetail 24. Optionally, one or more internal passages extend through the interior of the airfoil 22, ending in openings 28 in the surface of the airfoil 22. A flow of cooling air is directed through the internal passages, to reduce the temperature of the airfoil 22. A ceramic coating system 32 is applied to at least some portions of the airfoil 22.

Figure 2:
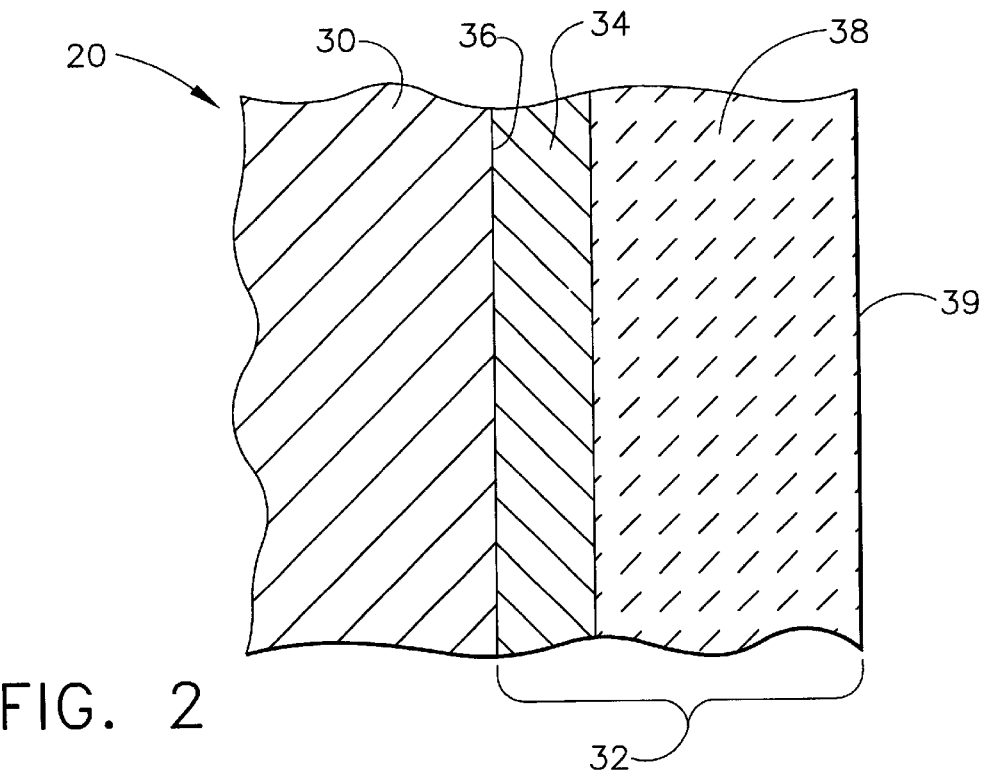
FIG. 2 is an enlarged schematic sectional view through the turbine blade of FIG. 1 on line 2—2, illustrating the coating structure.

FIG. 2 depicts in enlarged sectional view a region of the turbine blade 20, which serves as a substrate 30 for the ceramic coating system 32. The usual substrate is the airfoil 22, particularly the concave or pressure side of the airfoil 22. The ceramic coating system 32 includes an optional bond coat layer 34 bonded to a surface 36 of the substrate 30. The bond coat layer 34, which may be omitted in some circumstances, may be of any type known in the art. Examples include simple diffusion aluminides, diffusion aluminides modified with the addition of alloying elements such as platinum, or MCrAl(X)-type overlay bond coats. A layer of a ceramic coating 38, which may also be described as a ceramic thermal barrier coating, is bonded to the optional bond coat layer 34 and thence to the substrate 30, or directly to the substrate 30 in the event that there is no bond coat layer 34. There is an exposed surface 39 of the ceramic coating 38, which is exposed to a hostile environment during service. The hostile environment associated with the airfoil of a turbine blade or vane is a high temperature and a high velocity of combustion gas that contains a mixture of gases and solids such as particles that pass through the combustor and thence into the turbine.

Figure 3:
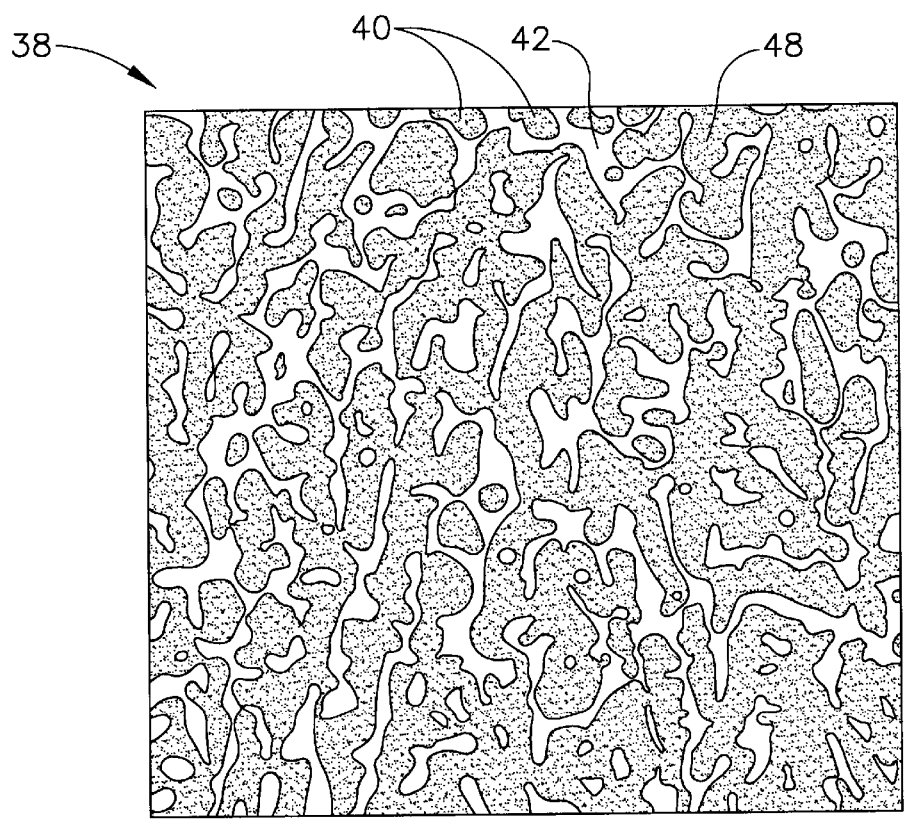
FIG. 3 is an depiction of the microstructure of the open-cell solid ceramic foam.

FIG. 3 is an idealized microstructure of the ceramic coating 38. The ceramic coating 38 comprises an open-cell solid foam 48 of ceramic cell walls 40 having an interconnected intracellular volume 42 therebetween. The ceramic cell walls 40 preferably comprise no less than 60 volume percent of the ceramic coating 38. Most preferably, the ceramic cell walls comprise from about 60 volume percent to about 80 volume percent of the solid foam 48. If the ceramic cell walls 40 comprise less than about 60 volume percent of the ceramic coating 38, the ceramic coating 38 may have insufficient strength for some applications.

The open-cell solid foam 48 comprises two interpenetrating phases, the ceramic cell walls 40 and the intracellular volume 42. The ceramic cell walls 40 are continuous within themselves, and the intracellular volume 42 is internally continuous within itself. A consequence of this structure is that either of the regions 40 or 42 may be removed in whole or in part to produce internal porosity, but in this case the material within the intracellular volume 42 is removed at least in part to create the ceramic foam 48 of the ceramic coating 38. The ceramic cell walls 40 have a continuous, self-supporting structure which maintains the physical integrity of the ceramic foam 48 and imparts to the ceramic foam 48 of the ceramic coating 38 the outward appearance and function of a solid body with a skeletal morphology.

The ceramic material of the ceramic cell walls 40 comprises a base ceramic such as aluminum oxide. Any compatible modifying ceramic may be used to achieve particular properties in the ceramic region, with the modifying ceramic present in an operable amount. For example, the modifying ceramic may be a ceramic material that is harder, more wear resistant, and/or more erosion resistant than the base ceramic. Some examples of abrasive modifying ceramics that are more wear or abrasion resistant than aluminum oxide and may be mixed with the aluminum oxide base ceramic include sol gel alumina and boron carbide. Other modifications may be made to favorably influence the behavior of the coating such as by reducing thermal conductivity (zirconia addition), increasing thermal expansion coefficient (zirconia addition), increasing resistance to gaseous environmental attack, increasing resistance to attack from solid or liquid contaminants, and achieving better surface characteristics (for example, smoothness, sealing or infrared reflectivity, as by small additions of iron, copper, or magnesium). Some of these modifications may be made at a later stage of the processing, such as by infusing the coating with a substance that affects the composition of the alumina.

The intracellular volume 42 occupies the remainder of the volume of the foam 48 of the ceramic coating 38. Because the intracellular volume 42 occupies less than half of the total volume, it is difficult to see from a planar microstructure such as FIG. 3 that the individual portions of the intracellular volume 42 are interconnected, but such is the case. At least a portion of the intracellular volume 42 is filled with a metallic alloy.

Some or all of the region of the intracellular volume 42 near the substrate 30 or bond coat 34 may be filled with a metal having a composition similar to that of the adjacent substrate 30 or bond coat 34, or a metal with an increased aluminum content as compared with the substrate 30 or bond coat 34, or mostly aluminum. The fill material is chosen as appropriate to increase bond strength and oxidation resistance at the outward surfaces of the substrate 30 or bond coat 34.

Figure 4:
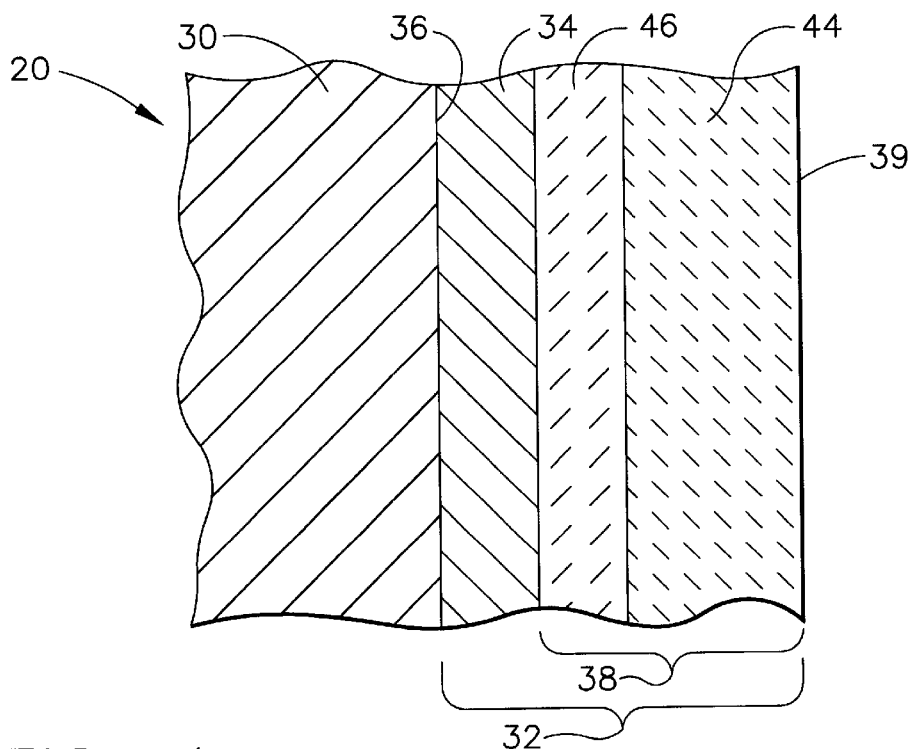
FIG. 4 is an enlarged schematic sectional view like that of FIG. 2, illustrating another coating structure.

FIG. 4 illustrates one such form of the ceramic coating 38. Throughout the entire ceramic coating of FIG. 4, the ceramic cell walls 40 (referring to FIG. 3) are the same, locally about 60 to about 80 volume percent of the ceramic coating 38. In a surface region 44 the intracellular volume 42 is empty and porous. In an interior region 46 the intracellular volume 42 is filled with a metal such as an aluminum-base alloy or a nickel-base alloy. The use of an aluminum-base alloy in the intracellular volume 42 of the interior region 46 may allow the bond coat layer 34 to be omitted, as the aluminumbase alloy in the intracellular volume 42 may both aid in the bonding of the ceramic coating 38 to the substrate 30 and also provide the protection against oxidation and hot corrosion that is normally provided by an aluminum-base bond coat 34.

Many other variations of the ceramic coating 38 are possible due to the ability to selectively remove portions of the ceramic cell walls 40 or the metal in the intracellular volume 42 at different places.

Figure 5:
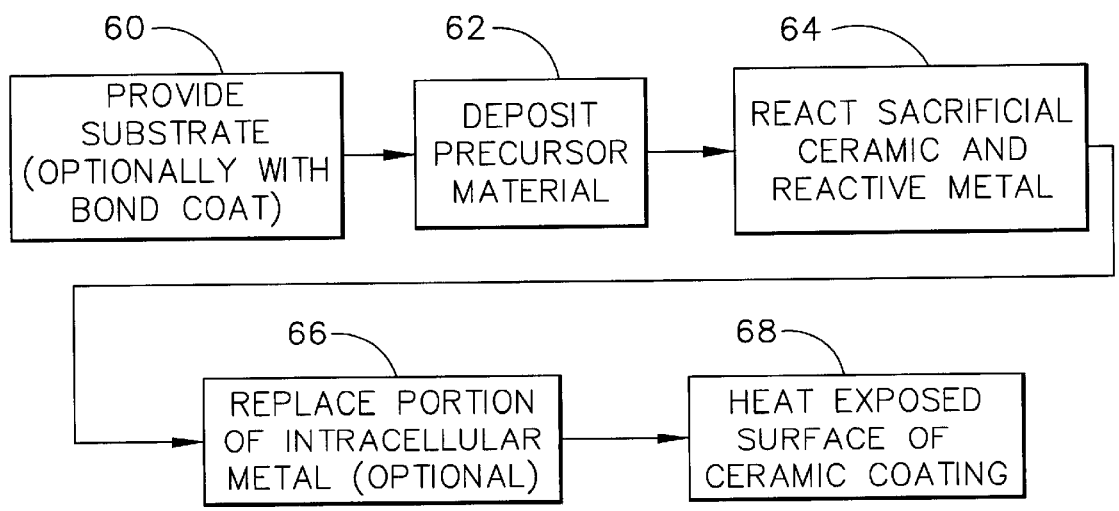
FIG. 5 is a block flow diagram of an approach for producing the coating structure.

FIG. 5 is a block flow diagram of a preferred approach for practicing the invention. The substrate 30 is provided, numeral 60. There may optionally be a previously deposited bond coat layer 34 already overlying and bonded to the surface 36 of the substrate 30.

The ceramic coating 38 is preferably prepared using the reactive techniques disclosed in U.S. Pat. Nos. 5,214,011 and 5,728,638, as modified for purposes of producing a coating. In this approach, the precursor material is provided and deposited, numeral 62. The precursor material includes a sacrificial ceramic form in the shape of the ceramic coating 38, and a reactive metal such as aluminum. The sacrificial ceramic form is preferably made of silicon dioxide (silica). This material is termed a "sacrificial" ceramic because it is consumed during the subsequent reaction process. Silicon dioxide may be deposited in the required thickness of the ceramic coating 38 by any operable technique, such as the application of a slurry of silicon dioxide frit in a carrier by painting, dipping or spraying; plasma spraying of silicon dioxide; or chemical vapor deposition. The thickness of the deposit may range from quite thin to very thick. The deposited silicon dioxide may be fired to consolidate and fuse the sacrificial ceramic by heating the deposit to a temperature of about 1975° F. for a period of about one hour. The firing process may be varied in order to influence the degree and morphology of the porosity. The reactive metal, such as aluminum, may be deposited by any operable technique, such as applying an aqueous slurry containing the reactive metal, and subsequently allowing the slurry to dry. The reactive metal may optionally be mixed with nonreactive metals such as a large fraction of nickel and other elements of the nickel-base alloy of interest for some applications, as disclosed in the '638 patent.

The sacrificial ceramic and the reactive metal are reacted together by heating them to a reaction temperature well in excess of the melting point of the reactive metal, numeral 64. Normally, the step 64 is performed after the step 62 is complete, but it may be preferred in some cases to perform the steps simultaneously so that the reaction occurs as the precursor material is deposited. In the case of aluminum, the reaction temperature is preferably in excess of about 300° C. greater than the melting point of aluminum. During this reaction, the ceramic of the sacrificial ceramic form is chemically reduced and the reactive metal is chemically oxidized. (Reduction and oxidation are broadly interpreted in the sense of electron transfer.) The reactive metal becomes an oxide or oxidized form, aluminum oxide in the preferred case. As a result of a mechanism involving volume changes and discussed in the '011 patent, the foam or sponge structure is formed throughout the ceramic as it transforms from the sacrificial form-composition to the final composition. The intracellular volume that results is filled with the metal used in the reaction process.

Optionally but preferably for the present applications, selected portions of the metal present in the intracellular volume 42 are replaced, numeral 66, as might be necessary for particular structures. In some cases, portions of the ceramic of the ceramic cell walls 40 may be removed in order to accomplish a replacement. Because each of the regions 40 and 42 is continuous, all or some of each of the regions 40 and 42 may be removed without affecting the other region. Some or all of the metal present in the cooled article at this point may be chemically removed by etching in an appropriate chemical. For example, aluminum may be removed by reaction with HCl or NaOH solutions. Some of the ceramic that forms the cell walls 40 may be chemically removed. For example, aluminum oxide may be removed by alkaline solutions such as KOH or NaOH, where aluminum has been previously replaced by a nickel-base alloy.

Portions of the aluminum metal may be replaced by immersing the foam composite material into a bath of the replacement liquid metal, such as nickel-base or copper-base alloys. Such replacement metals must have a melting point below that of the substrate 30, or the substrate will melt. The bath of the replacement liquid metal must be held at a temperature below the melting point of the substrate 30 for this reason. The composite material is maintained in the replacement liquid metal for a period of time, which depends upon the thickness of the composite material and the temperature. This immersion allows diffusion to take place such that the aluminum is replaced by the liquid replacement metal from the bath. As used herein, a disclosure of a metal includes both the pure form of the metal and its alloys. For example, "nickel" includes pure nickel and nickel-base alloys. As used herein, "metal-base" means that the composition has more of the named metal present than any other element. For example, a nickel-base alloy has more nickel than any other element. The nickel-base alloy may additionally be a nickel-base superalloy, meaning that it is of a composition which is strengthened by the precipitation of gamma-prime phase. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

The exposed surface 39 of the ceramic coating 38 is heated to an exposure temperature, numeral 68, such that at least some of the metallic alloy is lost from the intracellular volume 42 near the exposed surface 39. The exposed surface 39 is heated to any exposure temperature at which some of the metallic alloy is lost. Most preferably, the exposure temperature is above the solidus temperature of the metallic alloy. At such an exposure temperature, the metallic alloy is partially or completely molten. The molten metallic alloy is lost from the intracellular volume 42 by vaporization, ejection of the molten alloy by the high-velocity flow of combustion gas, ejection of the molten alloy by centrifugal force in the event that the substrate is rotating (e.g., a turbine blade), other mechanisms, or a combination of these mechanisms. Even though the molten alloy is lost from the intracellular volume 42, the article retains its shape and form, and thence its functionality at the exposed surface 39, due to the rigidity of the ceramic cell walls 40.

The result of the loss of the intracellular metallic alloy near to the exposed surface 39 is that the intracellular volume 42 near the exposed surface 39 becomes empty porosity. The combination of the ceramic cell walls 40 and the empty porosity of the intracellular volume 42 gives the ceramic coating 38 a very low thermal conductivity in the region close to the exposed surface 39, which retaining its form factor and shape as required for the service application. The ceramic coating is therefore a good thermal insulator.

The heating step 68 may be accomplished as part of the manufacturing and fabrication process prior to placing the coated substrate in service. Preferably, however, the heating step 68 is accomplished during initial service operations of the coated substrate or a break-in period of the coated substrate that simulates service operations. The reason for this preference is that the heating during service may not be uniform across the exposed surface 39. It is desirable to selectively produce the loss of the intracellular metal in the regions 80 (FIG. 6) that are heated to the highest temperatures in service and thereby reduce the thermal conductivity in those regions. At the same time, it is preferred that the intracellular volume 42 remain filled with the metallic alloy in the regions 82 that are not heated to the highest temperatures, because the presence of the metallic alloy aids in achieving good resistance to fracture in those regions 82. By conducting the heating step 68 as part of actual or simulated service conditions, the regions 80 and 82 are naturally identified, and the intracellular metallic alloy is removed only from the intracellular volume 42 in the regions 80.

Figure 6:
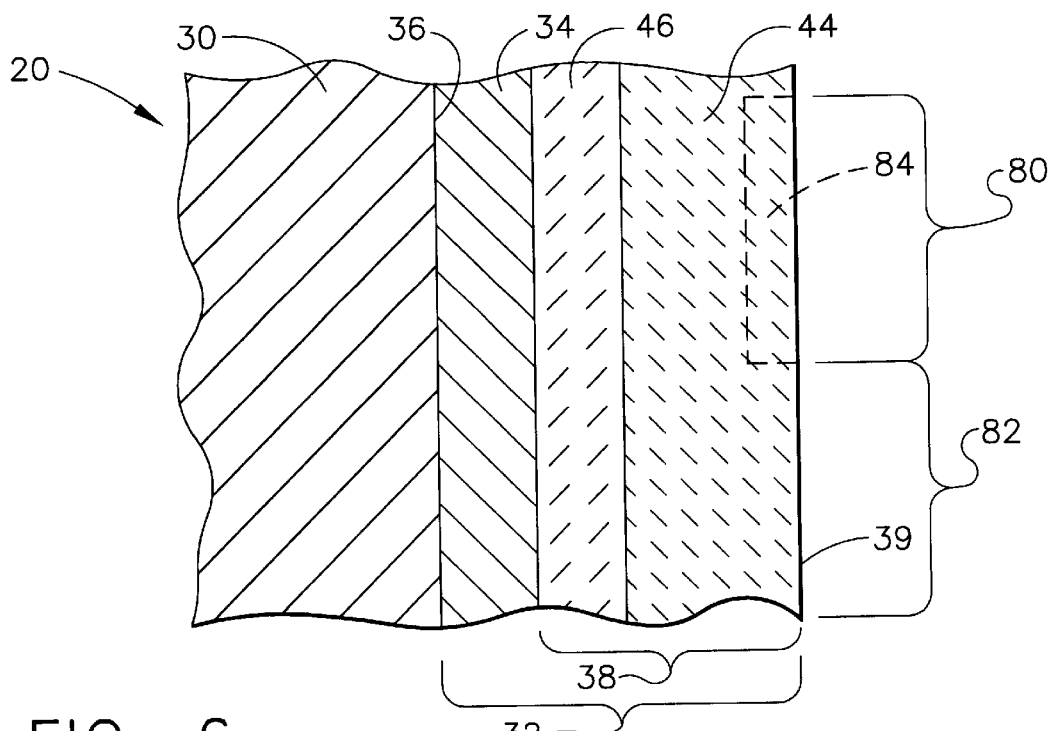
FIG. 6 is an enlarged schematic sectional view like that of FIG. 4, after local heating to an exposure temperature.

Thus, in FIG. 6, the coated substrate has been heated in service. The metallic alloy in the intracellular volume 42 has been lost from a transformed portion 84 of the ceramic coating 38 adjacent to the exposed surface 39 of the region 80, decreasing its thermal conductivity. The metallic alloy in the intracellular volumes 42 below the exposed surface 39 of the region 82 remains, as does the metallic alloy in the intracellular volumes between the transformed portion 84 and the interior region 46. The metallic alloy in these untransformed portions aids in promoting their fracture resistance.

Figure 7:
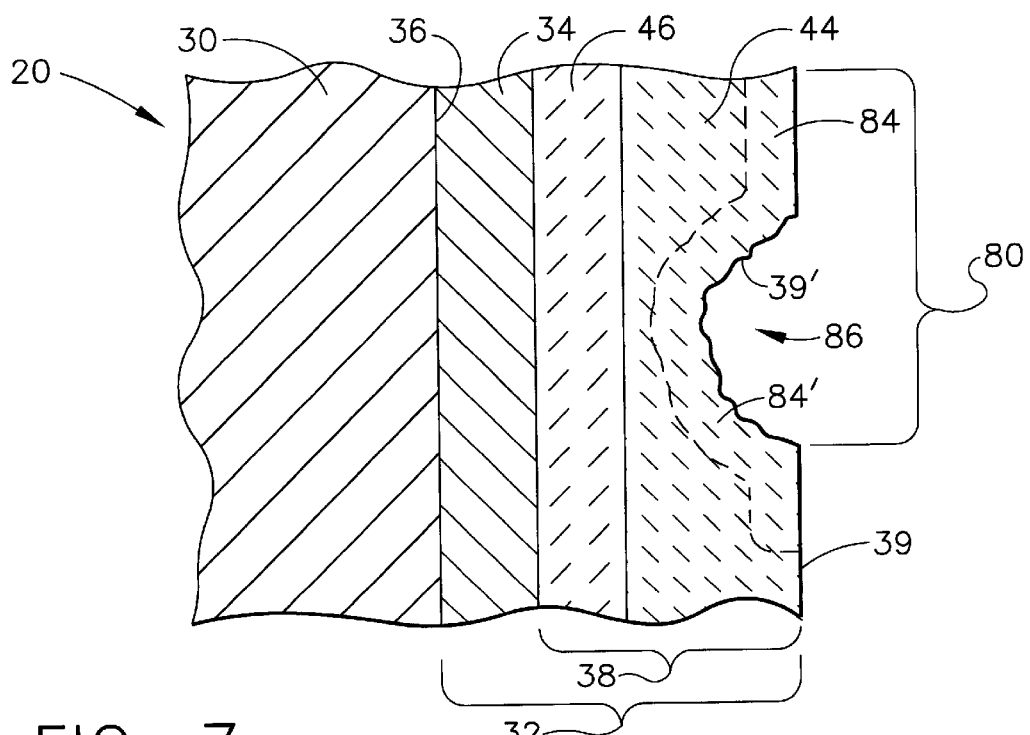
FIG. 7 is an enlarged schematic sectional view like that of FIG. 4, after the ceramic coating has been damaged during service and then been locally heated to the exposure temperature.

The employing of the heating step 68 in service also achieves a self-repairing or self-healing action. In FIG. 7, a piece of the ceramic coating 38 has been knocked out by impact of a particle that has passed through the combustor of the gas turbine and become entrained in the hot combustion gas flow, leaving a void 86. If the void 86 happens to be in the hottest region 80, the protection of the transformed portion 84 is no longer present because it was knocked out with the missing piece. However, the high-temperature exposure causes a repetition of the sequence of events that led to the formation of the transformed portion 84, which in turn leads to re-formation of a newly transformed portion 84' at the exposed surface 39' at the void 86. The loss of the previously transformed material with the loss of the missing piece is thereby counteracted with the formation of the newly transformed portion 84'. The self-healing does not result in an article that is "as good as new", because the void 86 remains. Instead, the selfhealing does allow the article to remain functional until it can be inspected and replaced.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for protecting a substrate, comprising the steps of
    providing a substrate;
    applying a ceramic coating overlying and bonded to the substrate, the ceramic coating comprising an open-cell solid foam of ceramic cell walls having an interconnected intracellular volume therebetween which is filled at least in part with a metallic alloy, the ceramic coating having an exposed surface remote from the substrate; and
    heating the exposed surface of the ceramic coating to an exposure temperature such that at least some of the metallic alloy is lost from the intracellular volume adjacent to the exposed surface, and the intracellular volume adjacent to the exposed surface, formerly containing the metallic alloy, becomes empty porosity.

2. The method of claim 1, wherein the exposure temperature is greater than the solidus temperature of the metallic alloy.

3. The method of claim 1, wherein the substrate comprises a nickel-base superalloy.

4. The method of claim 1, wherein the substrate is a component of a gas turbine engine.

5. The method of claim 1, wherein the ceramic cell walls comprise aluminum oxide.

6. The method of claim 1, wherein the step of heating includes the step of
    heating the exposed surface of the ceramic coating to an exposure temperature such that at least some of the metallic alloy is lost from the intracellular volume through the exposed surface by vaporization.

7. The method of claim 1, wherein the step of heating includes the step of
    heating the exposed surface of the ceramic coating to an exposure temperature such that at least some of the metallic alloy is lost from the intracellular volume through the exposed surface by ejection.

8. The method of claim 1, wherein the step of applying a ceramic coating includes the step of
    depositing the ceramic coating.

9. A method for protecting a substrate, comprising the steps of
    providing a substrate;
    applying a ceramic coating overlying and bonded to the substrate, the ceramic coating comprising an open-cell solid foam of ceramic cell walls having an interconnected intracellular volume therebetween which is filled at least in part with a metallic alloy, the ceramic coating having an exposed surface remote from the substrate, wherein the ceramic cell walls comprise from about 60 to about 80 volume percent of the ceramic coating; and
    heating the exposed surface of the ceramic coating to an exposure temperature such that at least some of the metallic alloy is lost from the intracellular volume.

10. A method for protecting a substrate, comprising the steps of providing a substrate, wherein the step of providing a substrate includes the step of providing a bond coat on the substrate;

applying a ceramic coating overlying and bonded to the substrate such that the bond coat is disposed between the substrate and the ceramic coating and aids in bonding the ceramic coating to the substrate, the ceramic coating comprising an open-cell solid foam of ceramic cell walls having an interconnected intracellular volume therebetween which is filled at least in part with a metallic alloy, the ceramic coating having an exposed surface remote from the substrate; and heating the exposed surface of the ceramic coating to an exposure temperature such that at least some of the metallic alloy is lost from the intracellular volume.

11. A method of preparing a structure protected by a ceramic coating, comprising the steps of providing a substrate having a surface;

depositing a precursor material onto the surface of the substrate, the precursor material comprising
a sacrificial ceramic, and
a reactive metal which is reactive with the sacrificial ceramic to form an open-celled ceramic foam;

reacting the sacrificial ceramic and the reactive metal to form a ceramic coating having an exposed surface and ceramic cell walls of an oxidized ceramic of the reactive metal, and an interconnected intracellular volume therebetween filled at least in part with a metallic alloy; and heating the exposed surface of the ceramic coating to an exposure temperature such that at least some of the metallic alloy is lost from the intracellular volume.

12. The method of claim 11, including an additional step, after the step of reacting, of replacing at least a portion of the metallic alloy with a replacement metal.

13. The method of claim 11, wherein the sacrificial ceramic comprises silicon dioxide.

14. The method of claim 11, wherein the reactive metal comprises aluminum.

15. The method of claim 11, wherein the exposure temperature is greater than a solidus temperature of the metallic alloy.

16. The method of claim 11, wherein the substrate comprises a nickel-base superalloy.

17. The method of claim 11, wherein the substrate is a component of a gas turbine engine.

18. The method of claim 11, wherein the ceramic cell walls comprise aluminum oxide.

19. The method of claim 11, wherein the ceramic cell walls comprise from about 60 to about 80 volume percent of the ceramic coating.

* * * * *